(12) United States Patent
Sugimura et al.

(10) Patent No.: US 10,717,341 B2
(45) Date of Patent: Jul. 21, 2020

(54) VEHICULAR HEAT MANAGEMENT SYSTEM

(71) Applicant: DENSO CORPORATION, Kariya, Aichi-pref. (JP)

(72) Inventors: Kengo Sugimura, Kariya (JP); Yoshiki Kato, Kariya (JP); Masayuki Takeuchi, Kariya (JP); Keigo Sato, Kariya (JP); Koji Miura, Kariya (JP); Norihiko Enomoto, Kariya (JP); Ariel Marasigan, Kariya (JP); Nobuyuki Hashimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 17 days.

(21) Appl. No.: 15/757,047

(22) PCT Filed: Aug. 25, 2016

(86) PCT No.: PCT/JP2016/074727
§ 371 (c)(1),
(2) Date: Mar. 2, 2018

(87) PCT Pub. No.: WO2017/038594
PCT Pub. Date: Mar. 9, 2017

(65) Prior Publication Data
US 2018/0339574 A1 Nov. 29, 2018

(30) Foreign Application Priority Data

Jul. 26, 2016 (JP) ................................. 2016-146364

(51) Int. Cl.
*B60H 1/02* (2006.01)
*B60H 1/32* (2006.01)
(Continued)

(52) U.S. Cl.
CPC ............. *B60H 1/025* (2013.01); *B60H 1/004* (2013.01); *B60H 1/00314* (2013.01); *B60H 1/06* (2013.01);
(Continued)

(58) Field of Classification Search
CPC ................ B60H 1/025; B60H 1/32281; B60H 1/00314; B60H 1/004; B60H 1/06
(Continued)

(56) References Cited

U.S. PATENT DOCUMENTS 4,255,789 A * 3/1981 Hartford ................ F02D 41/263
123/406.65
6,343,572 B1 * 2/2002 Pfaff ....................... F01P 7/164
123/41.01
(Continued)

FOREIGN PATENT DOCUMENTS

CN 104379895 10/2017
FR 2832786 A1 * 5/2003 ........... B60H 1/3201
(Continued)

*Primary Examiner* — Steven B McAllister
*Assistant Examiner* — Daniel E. Namay
(74) *Attorney, Agent, or Firm* — Harness, Dickey & Pierce, P.L.C.

(57) ABSTRACT

A vehicular heat management system includes a heat medium circuit, a heat source portion, and a device. A heat medium cooling an engine circulates in the heat medium circuit. The heat source portion heats the heat medium. The device is configured to function and heat the heat medium when the heat medium flowing into the device is at or above a predetermined temperature. When the engine is being warmed up, heat generated by the heat source portion is supplied to the device in preference to the engine. According to this, since the heat generated by the heat source portion
(Continued)

is supplied to the device in preference to the engine when the engine is being warmed up, the engine can be warmed up early.

12 Claims, 7 Drawing Sheets

(51) Int. Cl.
    *B60H 1/06*          (2006.01)
    *F01P 7/16*          (2006.01)
    *F01P 3/20*          (2006.01)
    *B60H 1/00*          (2006.01)
    *F02M 26/31*         (2016.01)
    *B60H 1/08*          (2006.01)
    *B60H 1/18*          (2006.01)
    *B60H 1/20*          (2006.01)
    *B60H 1/22*          (2006.01)

(52) U.S. Cl.
    CPC ............... *B60H 1/08* (2013.01); *B60H 1/18* (2013.01); *B60H 1/323* (2013.01); *B60H 1/32281* (2019.05); *F01P 3/20* (2013.01); *F01P 7/16* (2013.01); *F02M 26/31* (2016.02); *B60H 2001/00307* (2013.01); *B60H 2001/224* (2013.01); *B60H 2001/2253* (2013.01); *B60H 2001/2281* (2013.01); *F01P 2050/24* (2013.01); *F01P 2060/08* (2013.01); *F01P 2060/14* (2013.01); *F01P 2060/16* (2013.01)

(58) Field of Classification Search
    USPC ..................... 237/8 A, 2 A, 12.3 B
    See application file for complete search history.

(56) References Cited

U.S. PATENT DOCUMENTS

| | | | | |
|---|---|---|---|---|
| 2002/0145053 A1* | 10/2002 | Kuenstler | .................. | F01P 3/20 237/2 A |
| 2004/0089003 A1* | 5/2004 | Amaral | ............. | B60H 1/00907 62/186 |
| 2008/0245503 A1* | 10/2008 | Wilson | ............... | B60H 1/00371 165/42 |
| 2009/0183697 A1* | 7/2009 | Inui | ..................... | B60H 1/00921 123/41.02 |
| 2010/0012295 A1* | 1/2010 | Nemesh | ............. | B60H 1/00278 165/104.19 |
| 2011/0083920 A1* | 4/2011 | Mori | ...................... | B60H 1/025 180/68.4 |
| 2013/0284817 A1* | 10/2013 | Welle | ........................ | F24H 1/06 237/12.1 |
| 2014/0326010 A1* | 11/2014 | Kawakami | ............. | B60H 1/323 62/222 |
| 2014/0374498 A1* | 12/2014 | Quix | ........................ | B60H 1/04 237/12.3 R |
| 2015/0000327 A1* | 1/2015 | Kakehashi | ............... | F25D 17/02 62/434 |
| 2015/0105957 A1* | 4/2015 | Okamoto | ............... | B60W 10/30 701/22 |
| 2015/0129161 A1 | 5/2015 | Nishikawa et al. | | |
| 2015/0217622 A1* | 8/2015 | Enomoto | ........... | B60H 1/00878 165/42 |
| 2015/0240701 A1* | 8/2015 | Amano | ............... | B60H 1/00314 123/41.02 |
| 2016/0031291 A1* | 2/2016 | Enomoto | ........... | B60H 1/00385 62/179 |
| 2016/0082805 A1* | 3/2016 | Graaf | ................ | B60H 1/00899 165/202 |
| 2016/0109163 A1* | 4/2016 | Enomoto | ................ | F25B 13/00 62/160 |
| 2016/0153343 A1* | 6/2016 | Kakehashi | ......... | B60H 1/00278 123/41.31 |
| 2016/0159204 A1* | 6/2016 | Katoh | .................. | B60H 1/3211 62/185 |
| 2016/0167481 A1* | 6/2016 | Makihara | ............... | B60K 11/02 237/5 |
| 2016/0318499 A1* | 11/2016 | Yamanaka | ............... | B60L 1/003 |
| 2016/0332505 A1* | 11/2016 | Yamanaka | ............... | B60L 1/003 |
| 2016/0339761 A1* | 11/2016 | Enomoto | ........... | B60H 1/00278 |
| 2016/0339767 A1* | 11/2016 | Enomoto | ........... | B60H 1/00785 |
| 2017/0008373 A1* | 1/2017 | Makihara | ............... | B60K 11/02 |
| 2017/0182866 A1* | 6/2017 | Onishi | ............... | B60H 1/00778 |
| 2017/0297414 A1* | 10/2017 | Beloe | ................ | B60H 1/00278 |

FOREIGN PATENT DOCUMENTS

| | | | | |
|---|---|---|---|---|
| JP | 2010064527 A | | 3/2010 | |
| JP | 2013231574 A | * | 11/2013 | ........... F28D 9/0043 |
| JP | 2014009634 A | | 1/2014 | |
| JP | 2014201224 A | * | 10/2014 | ............ B60K 11/02 |

* cited by examiner

VEHICULAR HEAT MANAGEMENT SYSTEM

CROSS REFERENCE TO RELATED APPLICATIONS

This application is a U.S. National Phase Application under 35 U.S.C. 371 of International Application No. PCT/JP2016/074727 filed on Aug. 25, 2016 and published in Japanese as WO 2017/038594 A1 on Mar. 9, 2017. This application is based on and claims the benefit of priority from Japanese Patent Applications No. 2015-174348 filed on Sep. 4, 2015, and No. 2016-146364 filed on Jul. 26, 2016. The entire disclosures of all of the above applications are incorporated herein by reference.

TECHNICAL FIELD

The present disclosure relates to a heat management system for a vehicle.

BACKGROUND ART

Conventionally, Patent Document 1 discloses a vehicular cooling system that uses a high-pressure refrigerant of a refrigeration cycle as a heat source heating an engine.

In this conventional technology, a first coolant circuit, a second coolant circuit, a water-refrigerant heat exchanger, and a switching valve are provided. A coolant for the engine flows through the first coolant circuit. In the second coolant circuit, a coolant whose temperature is lower than that of the coolant flowing through the first coolant circuit flows. The water-refrigerant heat exchanger exchanges heat between the high-pressure refrigerant of the refrigeration cycle and the coolant. The switching valve switches a flow of the coolant such that the coolant in the first coolant circuit or the low-temperature coolant in the second coolant circuit flows into the water-refrigerant heat exchanger.

During warming up the engine, the switching valve switches a pathway of the coolant such that the coolant in the first coolant circuit flows into the water-refrigerant heat exchanger. According to this, the engine can be heated by using the high-pressure refrigerant of the refrigeration cycle as a heat source.

In the conventional technology, an EGR cooler is provided in the second coolant circuit. The EGR cooler exchanges heat between an EGR gas and the low-temperature coolant in the second coolant circuit to cool the EGR gas.

PRIOR ART DOCUMENT

Patent Document

Patent Document 1: JP 2010-064527 A

SUMMARY OF THE INVENTION

In the EGR cooler, the coolant is heated by the EGR gas. Accordingly, the coolant heated in the EGR cooler can be used for heating air. That is, a heat of the EGR gas can be used for heating air.

However, when the temperature of the coolant flowing into the EGR cooler is excessively low, a condensed water may be generated when the EGR gas is cooled by the EGR cooler, and accordingly a corrosion may occur. Accordingly, the coolant should not flow into the EGR cooler before the temperature of the coolant in the second coolant circuit increases to some extent.

Accordingly, before the temperature of the coolant in the second coolant circuit increases to some extent, the heat of the EGR gas may not be used for heating air, and an effect of improving fuel efficiency by recirculating the exhaust gas to the engine may not be obtained.

That is, the EGR cooler is capable of functioning to heat the heat medium when the heat medium flowing thereinto is at or above a predetermined temperature. It is preferred that the heat medium at or above the predetermined temperature flows early into such device, but it may be difficult to increase the temperature of the heat medium to be at or above the predetermined temperature during warming up of the engine due to a large heat capacity of an engine cooling system.

In consideration of the above-described points, it is an objective of the present disclosure to warm up an engine early.

A vehicular heat management system according to an aspect of the present disclosure includes: a heat medium circuit in which a heat medium cooling an engine circulates; a heat source portion that heats the heat medium; and a device that is configured to function and heat the heat medium flowing into the device. When the engine is being warmed up, heat generated by the heat source portion is supplied to the device in preference to the engine.

According to this, since the heat generated by the heat source portion is supplied to the device in preference to the engine when the engine is being warmed up, the heat generated by the heat source portion can be limited from being used for warming up the engine.

Therefore, since the heat medium flowing into the device can become at or above the predetermined temperature quickly, the device is capable of functioning early, and the heat medium can be heated early by using the device as a heat source. Consequently, the engine can be warmed up early.

EMBODIMENTS FOR EXPLOITATION OF THE INVENTION

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Embodiments will be described below with reference to the drawings. In the respective embodiments, a part that corresponds to a matter described in a preceding embodiment may be assigned the same reference numeral in the drawings.

First Embodiment

Figure 1:
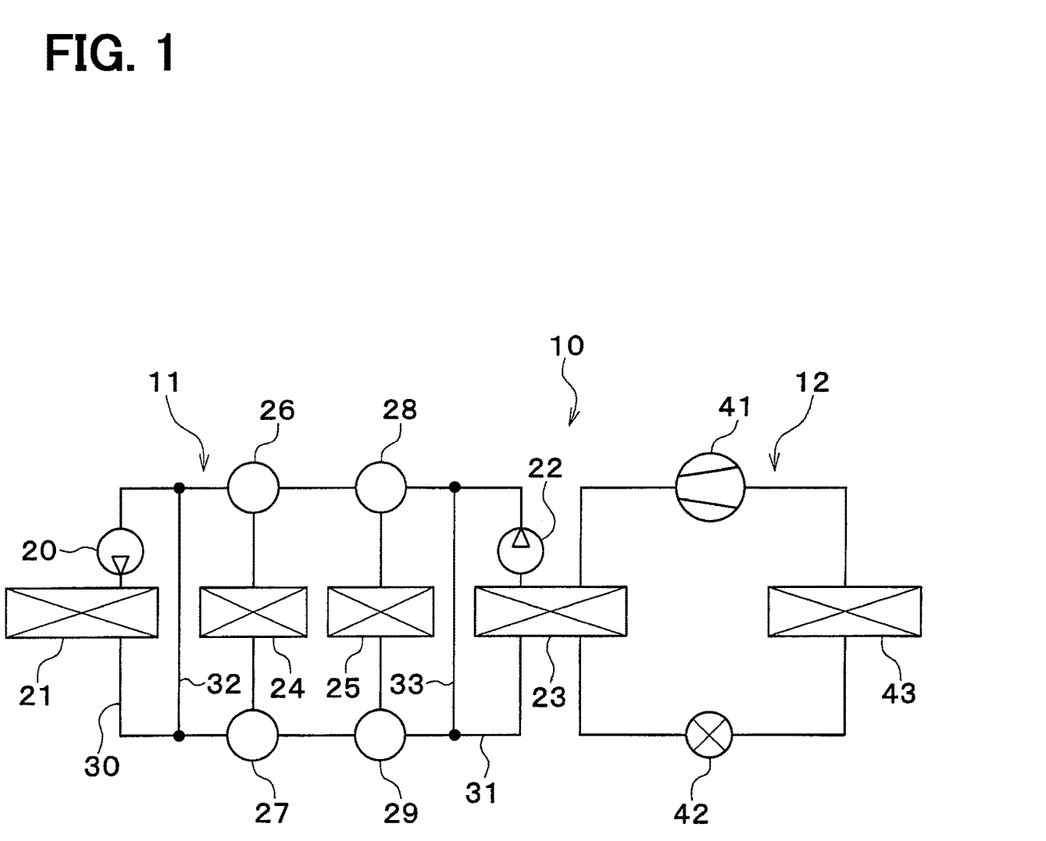
FIG. 1 is a diagram illustrating a vehicular heat management system according to a first embodiment of the present disclosure.

A vehicular heat management system 10 shown in FIG. 1 is used to adjust temperature of various devices mounted on a vehicle or a vehicle compartment to be appropriate.

In the present embodiment, the vehicular heat management system 10 is applied to a hybrid vehicle that can obtain a vehicle-travel driving force from both an engine and a traveling electric motor.

The hybrid vehicle in this embodiment is configured as a plug-in hybrid vehicle that is capable of charging the battery mounted on the vehicle, with power supplied from an external power source while the vehicle is parked. For example, a lithium ion battery can be used as the battery.

The driving force output from the engine is used not only to cause the vehicle to travel, but also to operate a power generator. The power generated by the power generator and the power supplied from an external power source can be stored in the battery. The power stored in the battery is supplied not only to the traveling electric motor, but also to various vehicle-mounted devices, including electric components constituting the vehicular heat management system 10.

The vehicular heat management system 10 includes a coolant circuit 11 and a refrigeration cycle 12. A coolant circulates in the coolant circuit 11. The refrigeration cycle is a vapor-compression refrigerator.

The coolant is a fluid as a heat medium. For example, the coolant suitable for use may be a liquid containing at least ethylene glycol, polydimethylsiloxane or nanoparticles, or an antifreezing fluid. The coolant circuit 11 is a heat medium circuit in which the heat medium circulates.

The coolant circuit 11 includes an engine pump 20, an engine 21, a condenser pump 22, a condenser 23, an EGR cooler 24, a heater core 25, a first switching valve 26, a second switching valve 27, a third switching valve 28, and a fourth switching valve 29.

The engine pump 20 is an electric pump that draws and discharges the coolant. The engine pump 20 may be a belt driven pump that is driven by a driving force transmitted from the engine 21 through a belt. The engine pump 20 and the engine 21 are arranged in series in an engine pathway (engine side pathway) 30.

The condenser pump 22 is an electric pump that draws and discharges the coolant. The condenser 23 is a high-pressure side heat exchanger that heats the coolant by exchanging heat between the coolant and a high-pressure side refrigerant of the refrigeration cycle 12. The condenser 23 is a heat source portion that heats the coolant. The condenser pump 22 and the condenser 23 are arranged in series in a condenser pathway 31.

The vehicular heat management system 10 may include an electric heater instead of the condenser 23. The electric heater is a heat source portion that heats the coolant.

The EGR cooler 24 is a heat exchanger that exchanges heat between an exhaust gas returning to an intake side of the engine 21 and the coolant to cool the exhaust gas.

When the coolant whose temperature is below an operation temperature To flows into the EGR cooler 24, a condensed water may be generated when the exhaust gas is cooled in the EGR cooler 24. Therefore, it is required that the coolant whose temperature is blow the operation temperature To does not flow into the EGR cooler 24. The operation temperature To is a temperature of the coolant at which the EGR cooler 24 is capable of functioning. The operation temperature To is 60 degrees Celsius, for example.

When the coolant whose temperature is at or above the operation temperature To is introduced into the EGR cooler 24, the coolant is heated by a heat of the exhaust gas. That is, the EGR cooler 24 a device capable of functioning and heating the coolant when the temperature of the coolant flowing into the EGR cooler 24 is at or above a predetermined temperature To.

The heater core 25 is an air heating heat exchanger that exchanges heat between the coolant and the air sent to a vehicle compartment to heat the sent air. The heater core 25 is a heat exchanger used for heating the vehicle compartment.

The EGR cooler 24 and the heater core 25 are arranged in parallel with each other with respect to the flow of the coolant.

The EGR cooler 24 is connected to the engine pathway 30 and the condenser pathway 31 through the first switching valve 26 and the second switching valve 27.

The heater core 25 is connected to the engine pathway 30 and the condenser pathway 31 through the third switching valve 28 and the fourth switching valve 29.

The first switching valve 26, the second switching valve 27, the third switching valve 28, and the fourth switching valve 29 are switching portions that switches the flow of the coolant.

An engine side bypass pathway 32 is connected to the engine pathway 30. The engine side bypass pathway 32 is a pathway through which the coolant from the engine pathway 30 bypasses the EGR cooler 24 and the heater core 25.

A condenser side bypass pathway 33 is connected to the condenser pathway 31. The condenser side bypass pathway 33 is a pathway through which the coolant from the condenser pathway 31 bypasses the EGR cooler 24 and the heater core 25.

The vehicular heat management system 10 includes a radiator and a thermostat which are not shown in the drawings. The radiator is a heat exchanger that exchanges heat between the coolant and an outside air. The thermostat is a coolant temperature-sensitive valve. The coolant temperature-sensitive valve is a valve having a physical structure in which a valve body is moved by means of a thermo-wax whose volume changes based on the temperature to open or close the coolant passage.

When the temperature of the coolant is lower than the operation temperature To, the thermostat closes the coolant passage connected to the radiator to stop the flow of the coolant to the radiator. When the temperature of the coolant is higher than the operation temperature To, the thermostat opens the coolant passage connected to the radiator to flow the coolant to the radiator.

According to this, when the temperature of the coolant is lower than the operation temperature To, heat dissipation from the coolant to the outside air is limited, and a temperature increase of the coolant is enhanced. When the temperature of the coolant is higher than the operation temperature To, an excessive increase of the temperature of the coolant is limited by dissipating heat of the coolant to the outside air.

The refrigeration cycle 12 includes a compressor 41, the condenser 23, an expansion valve 42, and an evaporator 43. The refrigerant used in the refrigeration cycle 12 is a chlorofluorocarbon refrigerant. The refrigeration cycle 12 is a subcritical refrigeration cycle in which a high-pressure side refrigerant pressure does not exceed the critical pressure of the refrigerant.

The compressor 41 is an electric compressor that is driven by power supplied from a battery, and the compressor 41 draws, compresses, and discharges the refrigerant in the refrigeration cycle 12. The compressor 41 may be a variable displacement compressor that is driven by an engine belt while being supplied with a driving force from the engine.

The condenser 23 is a heat exchanger that condenses the high-pressure side refrigerant by exchanging heat between the coolant and the high-pressure refrigerant discharged from the compressor 41.

The expansion valve 42 is a decompressor that decompresses and expands a liquid refrigerant flowing out of the condenser 23. The expansion valve 42 includes a thermo-sensitive portion that detects a superheat degree of the refrigerant on an outlet side of the evaporator 43 based on the temperature and the pressure of the refrigerant on the outlet side of the evaporator 43. That is, the expansion valve 42 is a thermal expansion valve that adjusts a throttle passage area by a mechanical mechanism such that the superheat degree of the refrigerant on the outlet side of the evaporator 43 is within a predetermined range. The expansion valve 42 may be an electric expansion valve that adjusts the throttle passage area by an electric mechanism.

The evaporator 43 is a low-pressure side heat exchanger that evaporates a low-pressure refrigerant decompressed and expanded by the expansion valve 42 via heat exchange between the low-pressure refrigerant and the air blown to the vehicle compartment. The gas-phase refrigerant evaporated at the evaporator 43 is drawn into and compressed by the compressor 41.

The vehicular heat management system 10 may include a chiller instead of the evaporator 43. The chiller is a low-pressure side heat exchanger that cools the coolant by exchanging heat between the coolant and the low-pressure refrigerant that is decompressed and expanded by the expansion valve 42.

Figure 2:
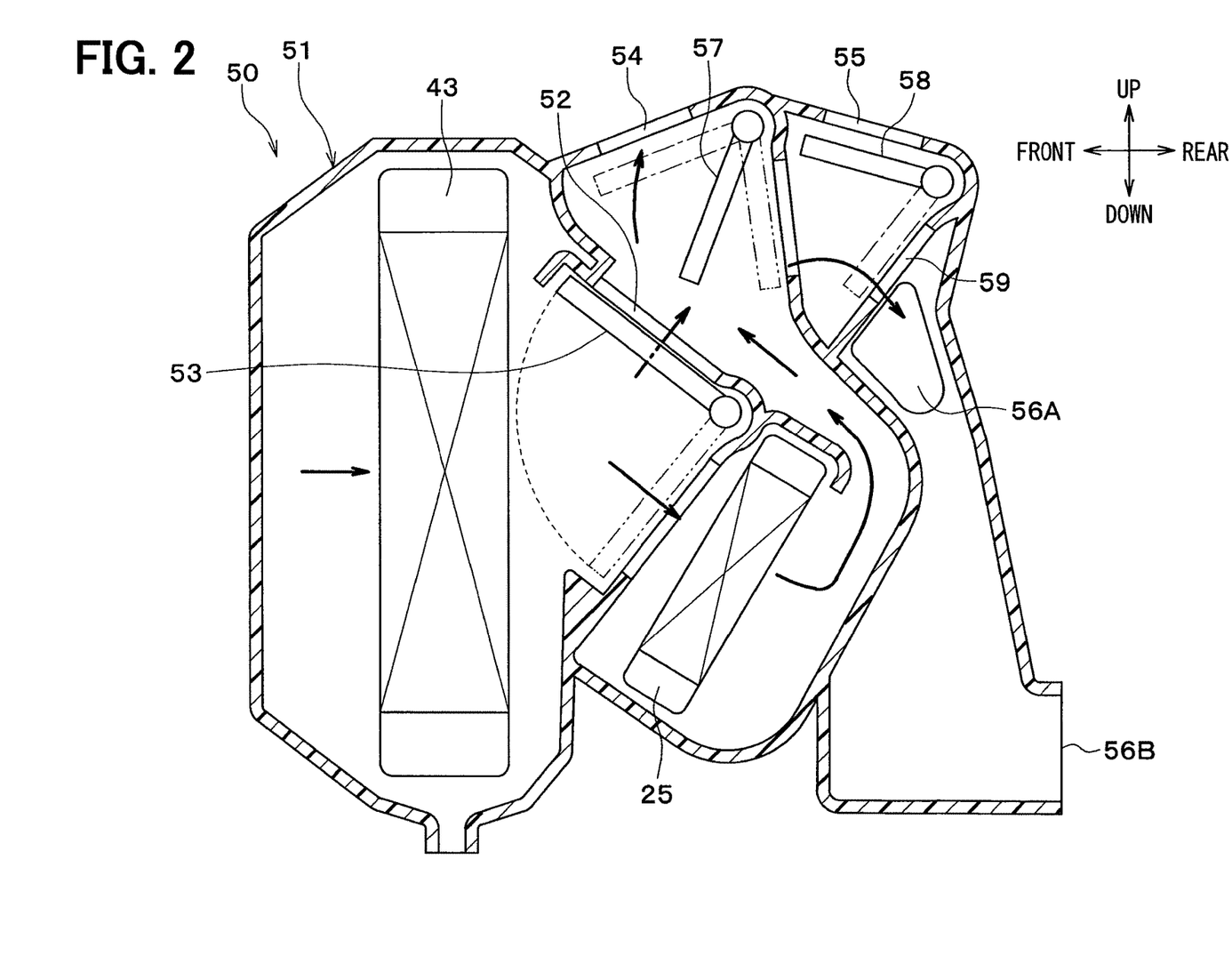
FIG. 2 is a cross-sectional diagram illustrating an inside air conditioning unit according to the first embodiment.

As shown in FIG. 2, the evaporator 43 and the heater core 25 are housed in a casing 51 of an inside air conditioning unit 50 of a vehicular air conditioning device. An air passage is defined in the casing 51.

Figure 3:
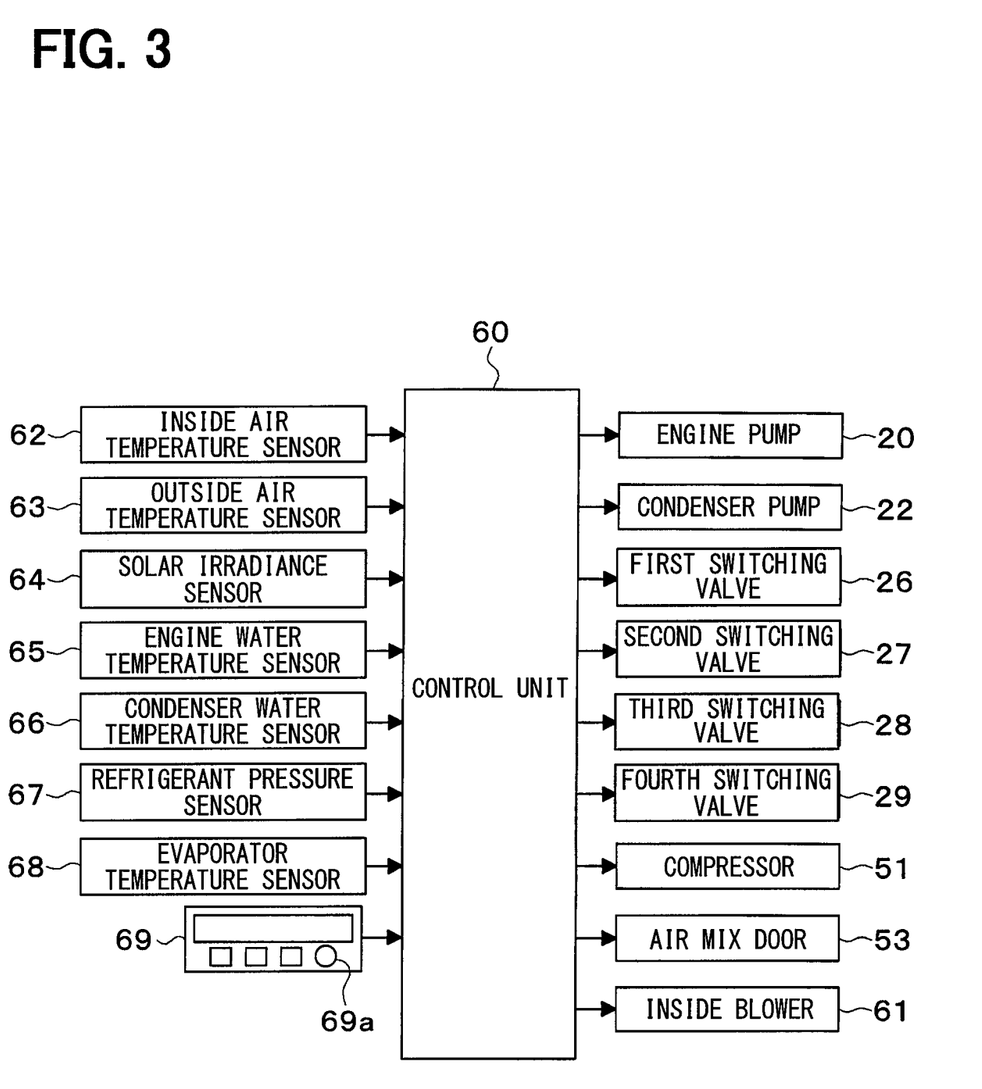
FIG. 3 is a block diagram illustrating an electric control unit of the vehicular heat management system according to the first embodiment.

An inside-outside air switching box that is not shown and an inside blower 61 shown in FIG. 3 are provided in the most upstream part of the casing 51. The inside-outside air switching box is an inside-outside air switching portion that switches the air introduced therein between an outside air and an inside air. The outside air is an air outside the vehicle compartment. The inside air is an air inside the vehicle compartment.

The inside blower 61 is a blowing portion that draws and blows an air. In the casing 51, the evaporator 43 and the heater core 25 are positioned downstream of the inside blower 61 with respect to the airflow. The heater core 25 is located downstream of the evaporator 43 with respect to the airflow. The inside blower 61 is an air flow rate adjustment portion that adjusts the flow rate of the air flowing through the heater core 25.

A cooling air bypass passage 52 is defined in the casing 51, and the cooling air bypass passage 52 is located downstream of the evaporator 43 with respect to the airflow. The cooling air bypass passage 52 is a passage through which a cooling air flowing through the evaporator 43 bypasses the heater core 25.

An air mix door 53 that is a temperature adjusting portion is provided between the evaporator 43 and the heater core 25. The air mix door 53 is a flow rate proportion adjustment portion that adjusts a ratio of the cool air flowing into the heater core 25 to the cooling air passing through the cooling air bypass passage 52 by adjusting an opening degree of the cooling air bypass passage 52 and an opening degree of the heater core 25 side air passage.

The air mix door 53 is a rotary door that includes a rotatable shaft that is rotatably supported by the casing 51, and a door board portion that is joined to the rotatable shaft.

The warm air flowing through the heater core 25 and the cool air flowing through the cooling air bypass passage 52 are mixed in the casing 51, and the temperature of the air blown to the space of the vehicle compartment is adjusted. Accordingly, the temperature of the conditioned air can be adjusted to a desired temperature by adjusting an opening degree of the air mix door 53.

A defogger opening portion 54, a face opening portion 55, a foot opening portion 56A, and a rear foot opening portion 56B are formed at a part of the casing 51 located on the most downstream portion with respect to the airflow.

The defogger opening portion 54 is connected to a defogger air outlet through a defogger duct that is not shown. The defogger air outlet is located in the space of the vehicle compartment. The conditioned air is blown through the defogger air outlet toward an inside of the windshield.

The face opening portion 55 is connected to a face air outlet through a face duct that is not shown. The face air outlet is located in the space of the vehicle compartment. The conditioned air is blown through the face air outlet toward an upper body of an occupant.

The foot opening portion 56A is connected to a foot duct that is not shown. The foot duct extends downward. The conditioned air is blown toward feet of the occupant in the front seats through a foot air outlet that is located in an end of the foot duct.

The rear foot opening portion 56B is connected to a rear foot duct that is not shown. The rear foot duct extends toward a rear side of the vehicle. The conditioned air is blown toward feet of the occupant in the rear seats through a rear foot air outlet that is located in an end of the rear foot duct.

The defogger opening portion 54 is opened and closed by a defogger door 57. The face opening portion 55, the foot opening portion 56A, and the rear foot opening portion 56B are opened and closed by a face-foot door 58.

The face-foot door 58 opens and closes a foot passage inlet portion 59, and accordingly the foot opening portion 56A and the rear foot opening portion 56B are opened and closed. The foot passage inlet portion 59 is an inlet portion of an air passage extending from a vicinity of the face opening portion 55 to the foot opening portion 56A and the rear foot opening portion 56B.

The defogger door 57 and the face-foot door 58 are rotary doors each of which includes a rotatable shaft rotatably supported by the casing 51 and a door board portion joined with the rotatable shaft.

Next, an electric control portion of the vehicular heat management system 10 will be described with reference to FIG. 3. A control unit 60 is constituted by a known microcomputer, including a CPU, a ROM, and a RAM, and a peripheral circuit thereof. The control unit 60 performs various computations and processing based on control programs stored in the ROM. Control target devices are connected to an output side of the control unit 60. The control unit 60 is a controlling portion that controls the operations of various control target devices.

The control target devices controlled by the control unit 60 include the engine pump 20, the condenser pump 22, the first switching valve 26, the second switching valve 27, the third switching valve 28, the fourth switching valve 29, the compressor 41, the air mix door 53 of the inside air conditioning unit 50, and the inside blower 61, for example.

Detection signals from a group of sensors are input to the input side of the control unit 60, the group of sensors including an inside air temperature sensor 62, an outside air temperature sensor 63, a solar irradiance sensor 64, an engine water temperature sensor 65, a condenser water temperature sensor 66, a refrigerant pressure sensor 67, and a evaporator temperature sensor 68, for example.

The inside air temperature sensor 62 is an inside air temperature detector that detects a temperature of the inside air. The outside air temperature sensor 63 is an outside air temperature detector that detects a temperature of the outside air. The solar irradiance sensor 64 is a solar irradiance detector that detects the amount of solar irradiance in the vehicle compartment.

The engine water temperature sensor 65 is a coolant temperature detector that detects a temperature of the coolant flowing through the engine pathway 30. The condenser water temperature sensor 66 is a coolant temperature detector that detects the temperature of the coolant flowing through the condenser pathway 31.

The refrigerant pressure sensor 67 is a refrigerant pressure detector that detects a pressure of the refrigerant. The evaporator temperature sensor 68 is a heat exchanger temperature detector that detects a temperature of the evaporator 43. For example, the evaporator temperature sensor 68 is a fin thermistor that detects a temperature of a heat exchanging fin of the evaporator 43. The evaporator temperature sensor 68 may be a coolant temperature sensor that detects the temperature of the coolant flowing through the evaporator 43.

Operation signals from air-conditioning operation switches that are provided on an operation panel 69 are input to the input side of the control unit 60. For example, the operation panel 69 is located close to an instrument panel in a front part of the vehicle compartment.

The air-conditioning operation switches provided on the operation panel 69 include a vehicle compartment temperature setting switch 69a, an auto switch, an air conditioning switch, a flow rate switch, and an air-conditioning stop switch, for example.

The switches may be push-buttons which connect electric contacts in response to physical press, or touchscreen type that acts when a specific electrostatic field on a panel is touched.

The vehicle compartment temperature setting switch 69a is a target temperature setting portion for setting a vehicle compartment target temperature Tset in response to the operation by the occupants. The auto switch is a switch for starting and stopping an auto control of the air conditioning. The air conditioning switch is a switch for starting or stopping cooling or dehumidifying. The flow rate switch is a switch for setting the amount of the air blown by the inside blower. The air-conditioning stop switch for stopping the air conditioning.

The control unit 60 determines an air-conditioning mode based on the temperature of the outside air and a target air temperature TAO of the air sent to the vehicle compartment. The target air temperature TAO is a value determined for quickly making an inside air temperature Tr closer to a target temperature Tset desired by occupants. The target air temperature TAO is calculated by the following formula.

$$TAO = Kset \times Tset - Kr \times Tr - Kam \times Tam - Ks \times Ts + C \qquad F1$$

In this formula, Tset is a target temperature of the vehicle compartment that is set by using the vehicle compartment temperature setting switch 69a, Tr is the temperature of the inside air detected by the inside air temperature sensor 62, Tam is the temperature of the outside air detected by the outside air temperature sensor 63, and Ts is the amount of solar irradiance detected by the solar irradiance sensor 64. Kset, Kr, Kam, Ks are control gains, and C is a constant for compensation.

Next, actuations of the above-described configurations will be described below. When the compressor 41 and the engine 21 are started, the control unit 60 executes control processes shown in the flowchart of FIG. 4.

Figure 4:
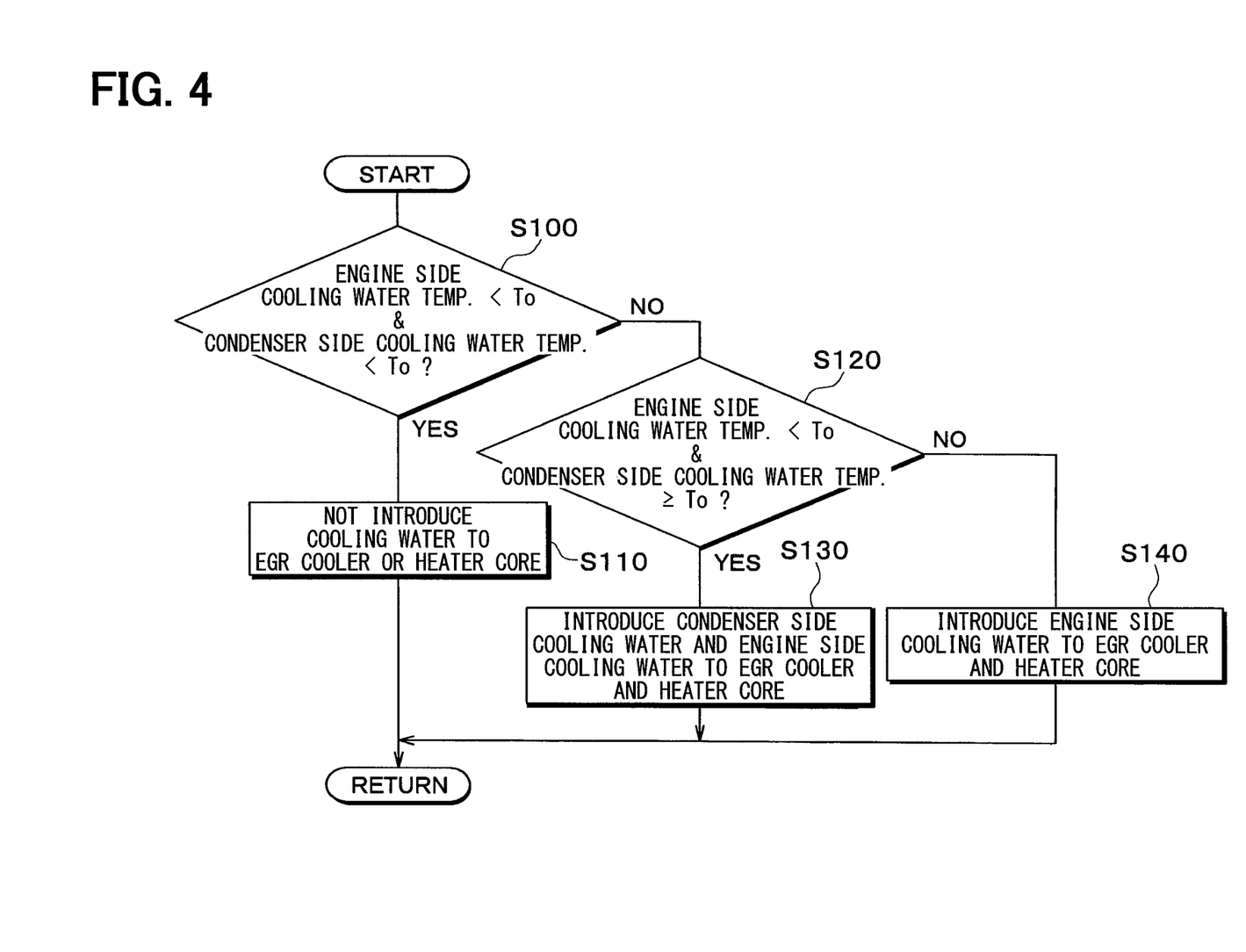
FIG. 4 is a flowchart illustrating a control process performed by the control unit of the vehicular heat management system according to the first embodiment.

First, in step S100, it is determined whether both the temperature of the coolant on the engine 21 side and the temperature of the coolant on the condenser 23 side are below the operation temperature To. The temperature of the coolant on the engine 21 side is the temperature of the coolant detected by the engine water temperature sensor 65. The temperature of the coolant on the condenser 23 side is the temperature detected by the condenser water temperature sensor 66.

For example, the operation temperature To is 60 degrees Celsius. When the coolant that is blow the operation temperature To flows into the EGR cooler 24, a condensed water may be generated when the exhaust gas is cooled by the EGR cooler 24. Accordingly, it is required that the coolant below the operation temperature To should not flow into the EGR cooler 24.

When it is determined that both the temperature of the coolant on the engine 21 side and the temperature of the coolant on the condenser 23 side are below the operation temperature To in step S100, the process proceeds to step S110. For example, immediately after stating the compressor 41 and the engine 21, both the temperature of the coolant on the engine 21 side and the temperature of the coolant on the condenser 23 side are below the operation temperature To.

In step S110, operations of the first switching valve 26, the second switching valve 27, the third switching valve 28, the fourth switching valve 29 are controlled such that the coolant does not flow into the EGR cooler 24 or the heater core 25. In step S110, the operations of the first switching valve 26, the second switching valve 27, the third switching valve 28, the fourth switching valve 29 may be controlled such that the amount of coolant on the condenser 23 side flowing into the EGR cooler 24 or the heater core 25 decreases compared to a condition where the temperature of the coolant on the condenser 23 side is at or above the operation temperature To.

Figure 5:
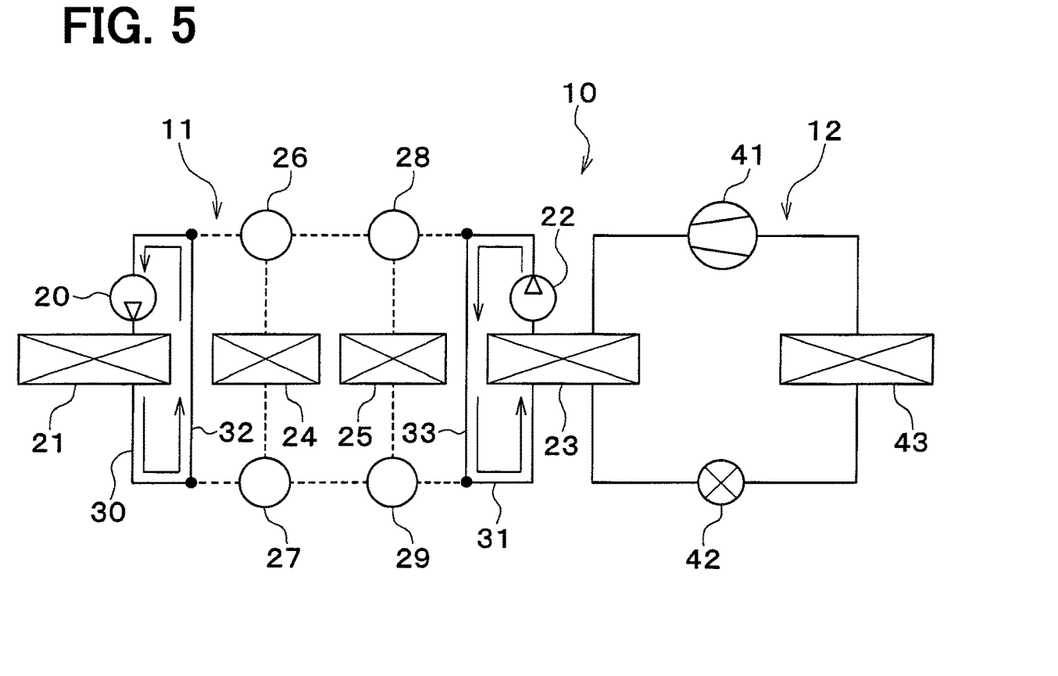
FIG. 5 is a diagram illustrating an operation mode of the vehicular heat management system according to the first embodiment.

Specifically, as shown in FIG. 5, the operations of the first switching valve 26, the second switching valve 27, the third switching valve 28, the fourth switching valve 29 are controlled such that the EGR cooler 24 and the heater core 25 are disconnected from the engine pathway 30 and the condenser pathway 31.

According to this, the coolant on the engine 21 side circulates in the engine pump 20, the engine 21, and the engine side bypass passage 32. The coolant on the condenser 23 side circulates in the condenser pump 22, the condenser 23, and the condenser side bypass passage 33.

In contrast, when it is determined that at least one of the temperature of the coolant on the engine 21 side and the temperature of the coolant on the condenser 23 side is not below the operation temperature To in step S100, the process proceeds to step S120.

In step S120, it is determined whether the temperature of the coolant on the engine 21 side is below the operation temperature To and whether the temperature of the coolant on the condenser 23 side is at or above the operation temperature To.

When it is determined in step S120 that: the temperature of the coolant on the engine 21 side is below the operation temperature To; and the temperature of the coolant on the condenser 23 side is at or above the operation temperature To, the process proceeds to step S130. For example, some time after starting the compressor 41 and the engine 21, the temperature of the coolant on the condenser 23 is at or above the operation temperature To.

In step S130, the operations of the first switching valve 26, the second switching valve 27, the third switching valve 28, and the fourth switching valve 29 are controlled such that the coolant on the condenser 23 side and the coolant on the engine 21 side flow into the EGR cooler 24 and the heater core 25.

Figure 6:
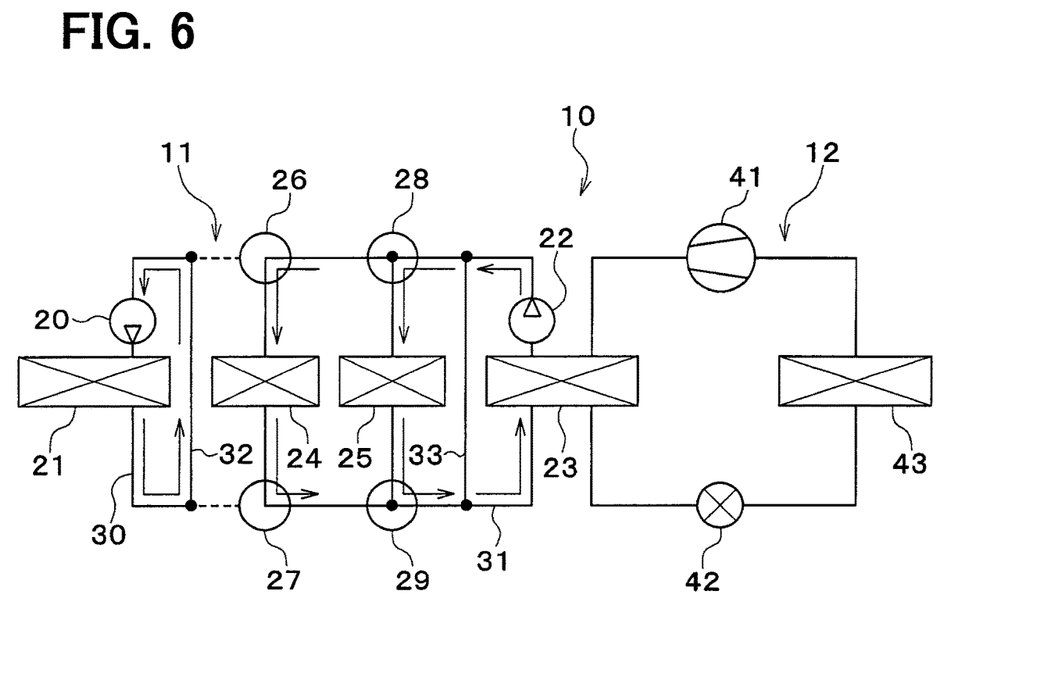
FIG. 6 is a diagram illustrating another operation mode of the vehicular heat management system according to the first embodiment.

Specifically, as shown in FIG. 6, the operations of the first switching valve 26, the second switching valve 27, the third switching valve 28, and the fourth switching valve 29 are controlled such that the EGR cooler 24 and the heater core 25 are connected to the condenser pathway 31. Subsequently, the operations of the first switching valve 26, the second switching valve 27, the third switching valve 28, and the fourth switching valve 29 are controlled such that the EGR cooler 24 and the heater core 25 are connected to both the condenser pathway 31 and the engine pathway 30.

In contrast, when it is determined that the temperature of the coolant on the engine 21 side is not below the operation temperature To in step S120, the process proceeds to step S140, and the operations of the first switching valve 26, the second switching valve 27, the third switching valve 28, and the fourth switching valve 29 are controlled such that the coolant on the engine 21 side flows into the EGR cooler 24 and the heater core 25.

Specifically, the operations of the first switching valve 26, the second switching valve 27, the third switching valve 28, and the fourth switching valve 29 are controlled such that the EGR cooler 24 and the heater core 25 are connected to the engine pathway 30.

Figure 7:
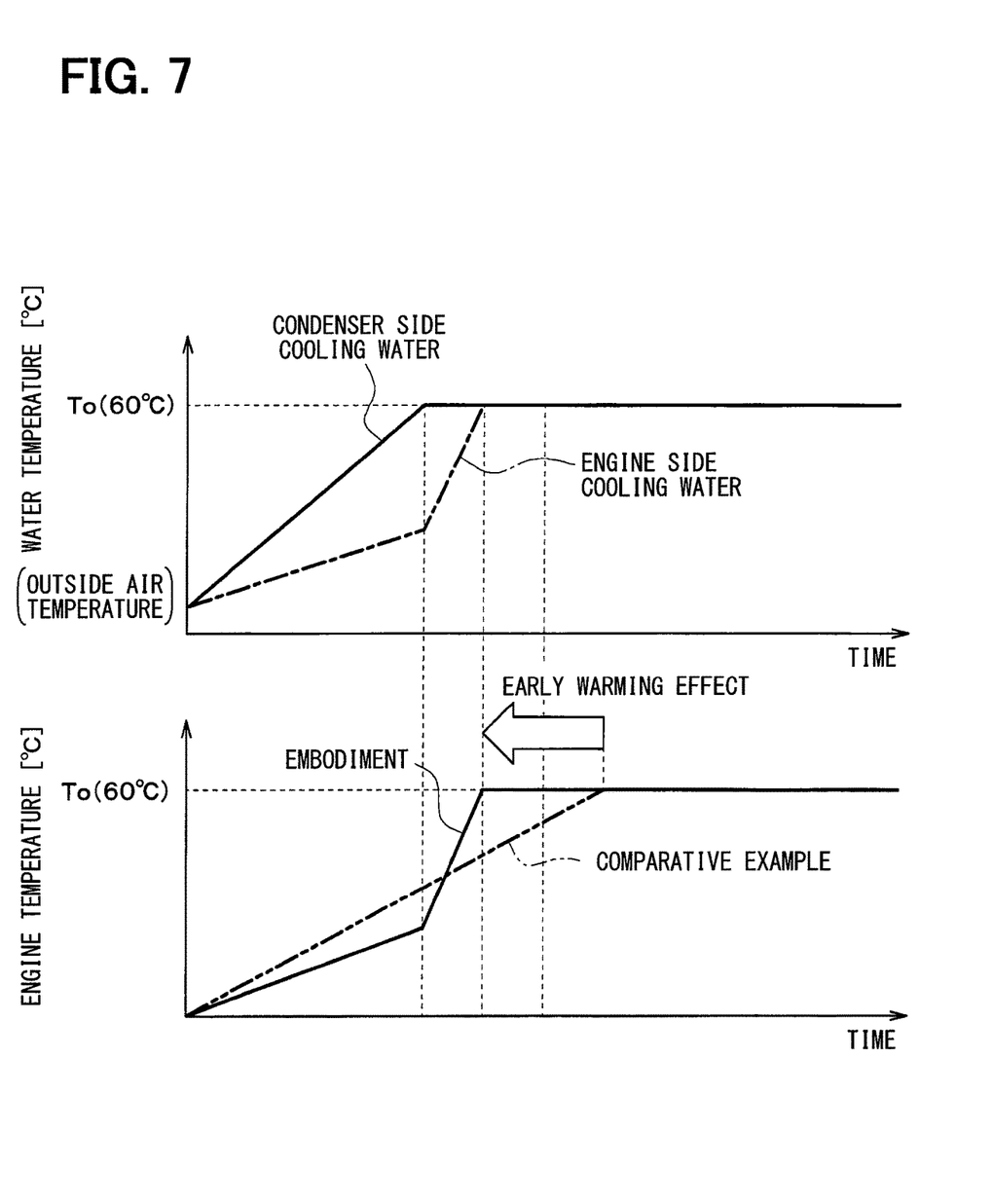
FIG. 7 is a time graph illustrating an example of result of operation of the vehicular heat management system according to the first embodiment.

An example of results of operations according to the present embodiment is shown in FIG. 7. FIG. 7 shows changes of the temperature of the coolant and the temperature of the engine varying with time after the compressor 41 and the engine 21 are started.

Immediately after the compressor 41 and the engine 21 are started, both the temperature of the coolant on the engine 21 side and the temperature of the coolant on the condenser 23 side are at an outside air corresponding temperature which is below the operation temperature To, as shown in FIG. 7. Therefore, the coolant circuit is switched as shown in FIG. 5, and the coolant does not flow into the EGR cooler 24 and the heater core 25. The outside air corresponding temperature may be a temperature corresponding to the temperature of the outside air. The outside air corresponding temperature may be approximately the same as the temperature of the outside air.

According to this, the temperature of the coolant on the engine 21 side is gradually increased by the heat dissipation of the engine 21, and the temperature of the coolant on the condenser 23 side is gradually increased by the heat dissipation of the condenser 23. That is, as shown in FIG. 7, heat is supplied to the coolant on the engine 21 side from the engine 21, and heat is supplied to the coolant on the condenser 23 side from the condenser 23.

At this time, since the heat capacity of the engine 21 is large, the temperature of the coolant on the condenser 23 side is increased more rapidly than the temperature of the coolant on the engine 21 side. Therefore, the coolant on the condenser 23 side becomes at or above the operation temperature To prior to the coolant on the engine 21 side.

When the coolant on the condenser 23 side becomes at or above the operation temperature To, the coolant circuit is switched as shown in FIG. 6, and the coolant on the condenser 23 side flows into the EGR cooler 24 and the heater core 25.

Since the temperature of the coolant flowing into the EGR cooler 24 is at or above the operation temperature To, the condensed water can be limited from being generated when the exhaust gas is cooled in the EGR cooler 24.

When the coolant flows into the EGR cooler 24, heat is supplied from the EGR cooler 24 to the coolant. That is, the heat of the exhaust gas is supplied to the coolant through the EGR cooler 24. Accordingly, the amount of heat supplied to the coolant on the condenser 23 side increases.

When the coolant flows into the heater core 25, the air sent to the vehicle compartment is heated by the heater core 25. That is, the vehicle compartment is heated. At this time, the heat supplied from the EGR cooler 24 to the coolant is used in the heater core 25 as well as the heat supplied from the condenser 23 to the coolant. Accordingly, the amount of heat supplied to the coolant from the condenser 23 for heating can be reduced, the energy consumption of the compressor 41 can be reduced.

When the coolant on the condenser 23 side flows into the EGR cooler 24 and the heater core 25, the flow rate of the coolant flowing into the EGR cooler 24 and the flow rate of the coolant flowing into the heater core 25 may be adjusted such that the temperature of the coolant flowing into the heater core 25 is at a predetermined temperature.

Subsequently, the coolant circuit is switched such that the coolant on the engine 21 side flows into the EGR cooler 24 and the heater core 25 as well as the coolant on the condenser 23 side.

According to this, since the heat is supplied from the condenser 23 and the EGR cooler 24 to the coolant on the engine 21 side, the coolant on the engine 21 side is rapidly heated to be at or above the operation temperature To.

Accordingly, the temperature of the engine 21 becomes at the operation temperature To early, i.e. the engine 21 is warmed early.

A line having alternate long dashes and pairs of short dashes shown in lower one of graphs of FIG. 7 represents a comparative example. In the comparative example, the coolant on the condenser 23 side starts flowing into the engine 21 immediately after the compressor 41 and the engine 21 are started. Accordingly, the engine 21 is warmed up by heat dissipation of the engine 21 and the condenser 23.

In contrast, according to the present embodiment, since the engine 21 is warmed up by heat dissipation of the engine 21, and heat dissipation of the condenser 23 is not used for warming up the engine 21 until the temperature of the coolant on the condenser 23 side reaches the operation temperature To, the temperature increase of the engine 21 is delayed in comparison with the comparative example.

After the temperature of the coolant on the condenser 23 side reaches the operation temperature To in the present embodiment, heat dissipation of the condenser 23 and the EGR cooler 24 as well as heat dissipation of the engine 21 are used for warming up of the engine 21. Consequently, the temperature of the engine 21 increases rapidly in comparison with the comparative example, and the engine 21 can be warmed up earlier.

In the present embodiment, as described in step S130 and FIG. 6, the control unit 60, the first switching valve 26, the second switching valve 27, the third switching valve 28, and the fourth switching valve 29 control the flow of the coolant such that the heat generated in the condenser 23 is supplied to the EGR cooler 24 in preference to the engine 21.

According to this, since the heat generated by the condenser 23 is supplied to the EGR cooler 24 in preference to the engine 21, the heat generated by the engine can be limited from being used for warming up the engine 21.

Accordingly, since the coolant flowing into the EGR cooler 24 becomes at or above the operation temperature To quickly, the EGR cooler 24 can function early, and the coolant can be heated early by using the EGR cooler 24 as heat source. Consequently, the engine 21 can be warmed up early.

In the present embodiment, the EGR cooler 24 and the heater core 25 are provided in parallel with each other with respect to the flow of the coolant. According to this arrangement, the temperature of the coolant flowing into the EGR cooler 24 can be increased early in comparison with a case where the EGR cooler 24 and the heater core 25 are provided in series with each other.

In the present embodiment, the first switching valve 26, the second switching valve 27, the third switching valve 28, and the fourth switching valve 29 switch a circulation condition of the coolant between the EGR cooler 24 and the heater core 25, and between the engine 21 and the EGR cooler 24.

According to this, the coolant pathway can be switched between a pathway in which the coolant heated by the engine 21 is supplied to the EGR cooler 24 and the heater core 25 and a pathway in which the coolant heated by the condenser 23 is supplied to the EGR cooler 24 and the heater core 25.

In the present embodiment, when the coolant temperature detected by the condenser water temperature sensor 66 is at or above the operation temperature To, the control unit 60 controls operations of the first switching valve 26, the second switching valve 27, the third switching valve 28, and the fourth switching valve 29 such that the coolant heated by the condenser 23 flows into the EGR cooler 24.

According to this, since the coolant below the operation temperature To can be limited from flowing into the EGR cooler 24, a generation of the condensed water on the EGR cooler 24 can be limited.

In the present embodiment, as described in step S110 and FIG. 5, when the coolant temperature detected by the condenser water temperature sensor 66 is below the operation temperature To, the control unit 60 controls the operations of the first switching valve 26, the second switching valve 27, the third switching valve 28, and the fourth switching valve 29 such that the flow rate of the coolant heated by the condenser 23 and flowing through the heater core 25 decreases compared to a condition where the temperature of the coolant detected by the condenser water temperature sensor 66 is at or above the operation temperature To.

According to this, when the coolant heated by the condenser 23 is blow the operation temperature To, the coolant heated by the condenser 23 can be limited from exchanging heat in the heater core 25, and accordingly the temperature of the coolant heated by the condenser 23 can be increased to be at or above the operation temperature To quickly.

In the present embodiment, as described in step S130 and FIG. 6, when the coolant temperature detected by the condenser water temperature sensor 66 is at or above the operation temperature To, the control unit 60 controls the first switching valve 26, the second switching valve 27, the third switching valve 28, and the fourth switching valve 29 such that the coolant heated by the condenser 23 flows into the heater core 25 as well as the EGR cooler 24.

According to this, when the coolant heated by the condenser 23 is at or above the operation temperature To, the heater core 25 is capable of heating the air by using the coolant heated by the EGR cooler 24 as well as the coolant heated by the condenser 23. Therefore, the energy consumption of the condenser 23 for heating the vehicle compartment can be reduced. That is, the energy consumption of the compressor 41 can be reduced.

Second Embodiment

Figure 8:
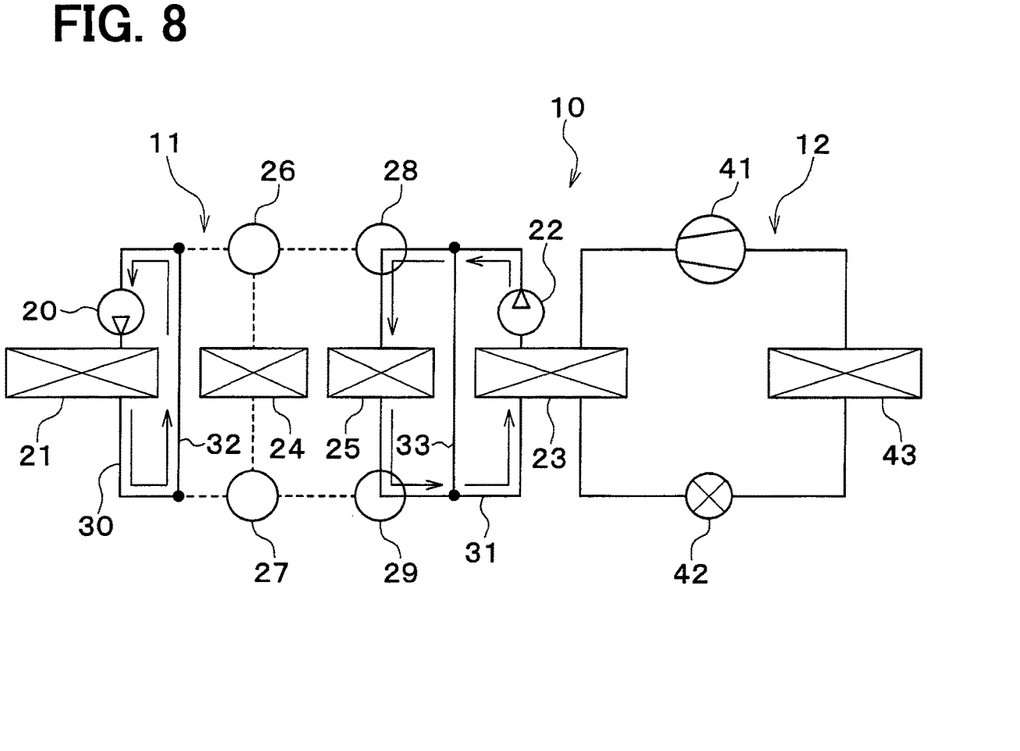
FIG. 8 is a diagram illustrating an operation mode of a vehicular heat management system according to a second embodiment.

In the above-described embodiment, when both the temperature of the coolant on the engine 21 side and the temperature of the coolant on the condenser 23 side are below the operation temperature To, the coolant is not introduced into the EGR cooler 24 or the heater core 25. In contrast, in the present embodiment, when both the temperature of the coolant on the engine 21 side and the temperature of the coolant on the condenser 23 side are below the operation temperature To, the coolant on the condenser 23 side is introduced into the heater core 25, as shown in FIG. 8.

Specifically, the first switching valve 26, the second switching valve 27, the third switching valve 28, and the fourth switching valve 29 are controlled such that the coolant on the condenser 23 side flows into the heater core 25 and does not flow into the EGR cooler 24.

Accordingly, the heater core 25 is capable of heating the air to some extent between a time immediately after the compressor 41 and the engine 21 are started and a time when the temperature of the coolant on the condenser 23 side increases to be the operation temperature To.

In this case, the control unit 60 preferably reduces the flow rate of the coolant flowing into the heater core 25 by controlling the first switching valve 26, the second switching valve 27, the third switching valve 28, and the fourth switching valve 29, and reduces the flow rate of the air flowing through the heater core 25 by controlling the inside blower 61. Since the heat exchange capacity of the heater core 25 decreases, the temperature of the coolant on the condenser 23 side can be increased to the operation temperature To quickly.

Figure 9:
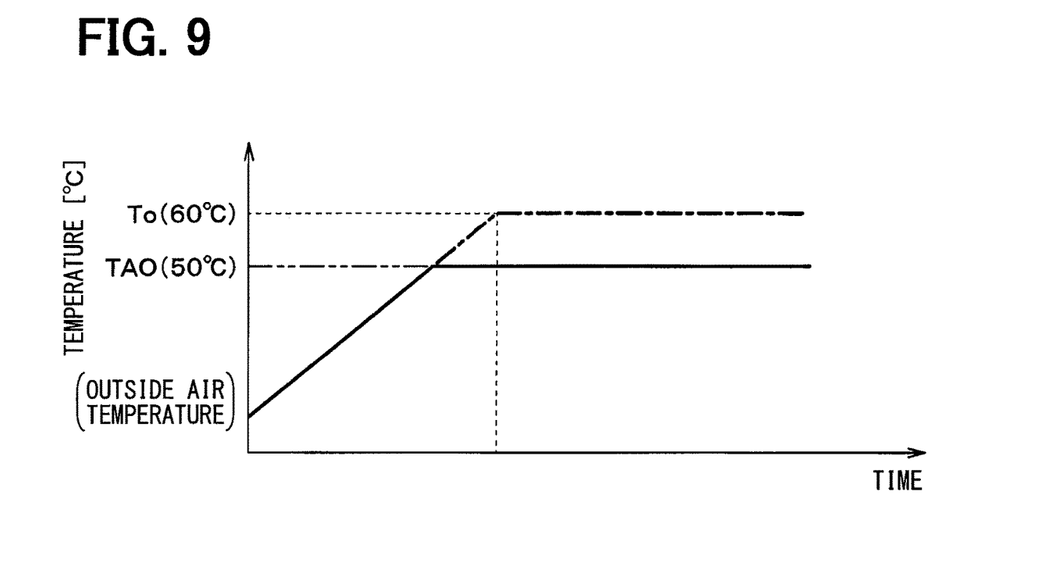
FIG. 9 is a time graph illustrating an example of result of operation of the vehicular heat management system according to the second embodiment.

A dot-and-dash line in FIG. 9 represents a change of the temperature of the coolant in the heater core 25. The temperature of the coolant in the heater core 25 increases up to the operation temperature To. Generally, the operation temperature To is set to be higher than the target air temperature TAO. In an example of FIG. 9, the operation temperature To is 60 degrees Celsius, and the target air temperature TAO is 50 degrees Celsius. Accordingly, the temperature of the air flowing through the heater core 25 may become higher than the target air temperature TAO.

It is preferable that the control unit 60 controls the operation of the air mix door 53 such that the temperature of the air blown from the inside air conditioning unit 50 approaches the target temperature TAO, as represented by the solid line in FIG. 9.

In the present embodiment, when the coolant temperature detected by the condenser water temperature sensor 66 is increasing toward the operation temperature To, the control unit 60 controls the operations of the first switching valve 26, the second switching valve 27, the third switching valve 28, and the fourth switching valve 29 such that the coolant heated by the condenser 23 flows into the heater core 25.

According to this, even when the coolant heated by the condenser 23 is below the operation temperature To, the air sent to the vehicle compartment can be heated by the heater core 25. Therefore, heating of the vehicle compartment can be started early.

In the present embodiment, when the coolant temperature detected by the condenser water temperature sensor 66 is increasing to the operation temperature To, the control unit 60 controls the operations of the inside blower 61, the first switching valve 26, the second switching valve 27, the third switching valve 28, and the fourth switching valve 29 such that at least one of the flow rate of the air flowing through the heater core 25 and the flow rate of the coolant flowing through the heater core 25 decreases compared to a condition where the temperature of the coolant detected by the condenser water temperature sensor 66 is at or above the operation temperature To.

According to this, since the amount of the heat exchange by the heater core 25 can be reduced, the temperature of the coolant can be increased to the operation temperature To quickly. Moreover, since the pressure of the high-pressure side refrigerant of the refrigeration cycle 12 can be increased, an increase rate of the temperature of the coolant can be increased.

In the present embodiment, when the coolant temperature detected by the condenser water temperature sensor 66 is higher than the target air temperature TAO, the control unit 60 controls the operation of the air mix door 53 such that a proportion of the air flowing through the heater core 25 decreases, and a proportion of the air bypassing the heater core 25 increases compared to a condition where the temperature of the coolant detected by the condenser water temperature sensor 66 is at or below the target air temperature TAO.

According to this, since the temperature of the air sent to the vehicle compartment can be limited from exceeding the target air temperature TAO even when the temperature of the coolant heated by the condenser 23 is higher than the target air temperature TAO, the temperature of the air sent to the vehicle compartment can be appropriately adjusted.

The above-described embodiments may be combined as desired. The above-described embodiments may be modified as follows, for example.

In the above-described embodiments, the coolant is used as the heat medium circulating in the coolant circuit 11, but another medium such as an oil can be used as the heat medium.

A nanofluid may be used as the heat medium. The nanofluid is a fluid containing nanometer-sized particles, called nanoparticles. Since the nanoparticles are contained, the following effects can be obtained in addition to the effect of decreasing the freezing point like a coolant containing ethylene glycol (i.e. antifreeze mixture).

That is, an effect of improving thermal conductivity within a specific temperature range, an effect of increasing a heat capacity of the heat medium, an effect of limiting corrosion of metal pipes and deterioration of rubber pipes, and an effect of increasing fluidity of the heat medium at an extremely low temperature can be obtained.

These effects vary based on components of nanoparticles, shapes of the particles, a proportion of the particles, and additives.

Thus, since the mixture of nanoparticles can improve its thermal conductivity, even in a small amount, the mixture of nanoparticles can exhibit substantially the same cooling efficiency, compared with the coolant using ethylene glycol.

Further, since the thermal capacity of the heat medium can be increased, a cold storage heat amount of the heat medium itself can be increased. The cold storage heat amount of the heat medium itself means the amount of stored cold heat due to its sensible heat.

By increasing the cold storage heat amount, the temperature adjustment, including cooling and heating, of the device can be performed using the cold heat storage for some period of time even though the compressor 41 is not operated, thereby saving the power of the vehicular heat management system 10.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, examples of the atom configuring the nanoparticles can include an Au nanoparticle, an Ag nanowire, a carbon nanotube (so-called CNT), a graphene, a graphite core-shell nanoparticle, an Au nanoparticle-containing CNT, and the like. The graphite core-shell nanoparticle is a particle body with the above-mentioned atom surrounded by a structure, such as a carbon nanotube.

In the refrigeration cycle 12 of the above-mentioned embodiment, a chlorofluorocarbon refrigerant is used as the refrigerant. However, the kind of refrigerant in use is not limited thereto and may be natural refrigerant, such as carbon dioxide, a hydrocarbon refrigerant, and the like.

The refrigeration cycle 12 in the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

Although the present disclosure has been fully described in connection with the embodiments thereof, it is to be noted that various changes and modifications will become apparent to those skilled in the art. Moreover, other combinations and configurations, including more, less or only a single element, are also within the spirit and scope of the present disclosure.

What is claimed is:

1. A vehicular heat management system comprising:
a heat medium circuit in which a heat medium cooling an engine circulates;
a heat source portion that heats the heat medium; and
an EGR cooler that is configured to function and heat the heat medium when the heat medium flowing into the EGR cooler is at or above a predetermined temperature;
a temperature sensor that detects a temperature of the heat medium heated by the heat source portion; and
a control unit that controls an operation of a switching portion such that the heat medium heated by the heat source portion flows into the EGR cooler when the temperature of the heat medium detected by the temperature sensor is at or above the predetermined temperature, wherein
when the engine is being warmed up, heat generated by the heat source portion is supplied to the EGR cooler in preference to the engine, and wherein
the switching portion is configured to stop a flow of the heat medium from the heat source portion to the EGR cooler, and wherein
the control unit is configured to control the switching portion to stop the flow of the heat medium from the heat source portion to the EGR cooler, in response to the temperature sensor detecting that the temperature of the heat medium is below the predetermined temperature.

2. The vehicular heat management system according to claim 1, further comprising:
a heater core that heats an air sent to a vehicle compartment by exchanging heat between the air and the heat medium, wherein the EGR cooler and the heater core are arranged in parallel with each other with respect to a flow of the heat medium.

3. The vehicular heat management system according to claim 1, wherein:
the switching portion switches a circulation condition of the heat medium between the EGR cooler, the heater core, the engine, and the heat source portion.

4. The vehicular heat management system according to claim 1, wherein
when the temperature of the heat medium detected by the temperature sensor is increasing to the predetermined temperature, the control unit controls the operation of the switching portion such that the heat medium heated by the heat source portion flows into the heater core.

5. The vehicular heat management system according to claim 4, further comprising:
an air flow rate adjusting portion that adjusts a flow rate of an air flowing through the heater core, wherein
the switching portion is configured to adjust a flow rate of the heat medium flowing through the heater core, and
when the temperature of the heat medium detected by the temperature sensor is increasing to the predetermined temperature, the control unit controls operations of the air flow rate adjusting portion and the switching portion such that at least one of the flow rate of the air flowing through the heater core and the flow rate of the heat medium flowing through the heater core decreases compared to a condition where the temperature of the heat medium detected by the temperature sensor is at or above the predetermined temperature.

6. The vehicular heat management system according to claim 4, further comprising:
a flow rate proportion adjusting portion that adjusts a proportion between the flow rate of the air flowing through the heater core and a flow rate of the air bypassing the heater core, wherein
when the temperature of the heat medium detected by the temperature sensor is higher than a target temperature, the control unit controls an operation of the flow rate proportion adjusting portion such that:
a proportion of the flow rate of the air flowing through the heater core decreases compared to a condition where the temperature of the heat medium detected by the temperature sensor is at or below the target temperature; and
a proportion of the flow rate of the air bypassing the heater core increases compared to the condition where the temperature of the heat medium detected by the temperature sensor is at or below the target temperature.

7. The vehicular heat management system according to claim 1, wherein
when the temperature of the heat medium detected by the temperature sensor is lower than the predetermined temperature, the control unit controls the operation of the switching portion such that a flow rate of the heat medium heated by the heat source portion and flowing through the heater core decreases compared to a condition where the temperature of the heat medium detected by the temperature sensor is at or above the predetermined temperature.

8. The vehicular heat management system according to claim 1, wherein
when the temperature of the heat medium detected by the temperature sensor is at or above the predetermined temperature, the control unit controls the operation of the switching portion such that the heat medium heated by the heat source portion flows into the EGR cooler and the heater core.

9. The vehicular heat management system according to claim 1, wherein
the EGR cooler cools an exhaust gas returning to an intake side of the engine by exchanging heat between the exhaust gas and the heat medium.

10. The vehicular heat management system according to claim 1, further comprising:
a vapor-compression refrigerator in which the refrigerant circulates, wherein
the heat source portion is a heat exchanger configured to heat the first heat medium by exchanging heat between the refrigerant and the first heat medium.

11. The vehicular heat management system according to claim 1, wherein the heat source portion is an electric heater.

12. A vehicular heat management system comprising:
a heat medium circuit in which a first heat medium for cooling an engine circulates;
a heat source portion that is disposed in the heat medium circuit and configured to heat the first heat medium;
an EGR cooler that is disposed in the heat medium circuit and configured to heat the first heat medium by exchanging heat between the first heat medium and a second heat medium;
a temperature sensor that is configured to detect a temperature of the first heat medium heated by the heat source portion;
a switching portion that is disposed between the heat source portion and the EGR cooler in the heat medium circuit and also disposed between the heat source portion and the engine in the heat medium circuit, the switching portion configured to selectively stop a flow of the first heat medium flowing from the heat source portion to the EGR cooler and to stop a flow of the first heat medium flowing from the heat source portion to the engine; and a controller that is coupled with the temperature sensor and the switching portion;

wherein the heat medium circuit has a bypass passage disposed between the heat source portion and the switching portion such that the first heat medium bypasses the EGR cooler by flowing through the bypass passage, and wherein the controller is programmed to control the switching portion to operate in a first mode, to stop the flow of the first heat medium to the EGR cooler and to stop the flow of the first heat medium from the heat source portion to the engine such that the first heat medium is heated by the heat source portion, in response to the temperature sensor detecting that the temperature of the first heat medium is lower than a predetermined temperature;

control the switching portion to operate in a second mode, to allow the first heat medium to flow from the heat source portion into the EGR cooler and to stop the flow of the first heat medium from the heat source to the engine, in response to the temperature sensor detecting that the temperature of the first heat medium has reached the predetermined temperature; and control the switching portion to allow the first heat medium to flow from the heat source portion into the engine and the EGR cooler after the switching portion operates in the second mode.

* * * * *

UNITED STATES PATENT AND TRADEMARK OFFICE
CERTIFICATE OF CORRECTION

PATENT NO. : 10,717,341 B2
APPLICATION NO. : 15/757047
DATED : July 21, 2020
INVENTOR(S) : Kengo Sugimura et al.

It is certified that error appears in the above-identified patent and that said Letters Patent is hereby corrected as shown below:

On the Title Page (30) Foreign Application Priority Data:
"Jul. 26, 2016 (JP) ...............................2016-146364"

Should be:
--Jul. 26, 2016 (JP) ...............................2016-146364
Sep. 4, 2015 (JP) ...............................2015-174348--

Signed and Sealed this
Twenty-second Day of December, 2020

Andrei Iancu
*Director of the United States Patent and Trademark Office*